US005547165A

United States Patent [19]

Brehm et al.

[11] Patent Number: 5,547,165

[45] Date of Patent: Aug. 20, 1996

[54] ELECTROMAGNETICALLY OPERATED PROPORTIONAL VALVE

[75] Inventors: Werner Brehm, Hemmingen; Horst Keuerleber, Eberdingen; Georg Koepff, Hemmingen; Markus Deeg, Schwieberdingen, all of Germany

[73] Assignee: Robert Bosch GmbH, Stuttgart, Germany

[21] Appl. No.: 289,750

[22] Filed: Aug. 12, 1994

[30] Foreign Application Priority Data

Sep. 3, 1993 [DE] Germany .......................... 43 29 760.9

[51] Int. Cl.$^{6}$ .......................... F16K 31/08

[52] U.S. Cl. .................. 251/129.16; 251/50; 251/129.08

[58] Field of Search ......................... 251/129.16, 129.08, 251/50

[56] References Cited

U.S. PATENT DOCUMENTS

| | | | |
|---|---|---|---|
| 1,754,740 | 4/1930 | Clarkson | 251/129.16 X |
| 2,374,895 | 5/1945 | Ray | 251/129.16 |
| 2,938,703 | 5/1960 | Dietz | 251/129.16 |
| 4,715,332 | 12/1987 | Kreuter | 251/129.16 X |
| 4,971,116 | 11/1990 | Suzuki et al. | 251/129.16 X |
| 5,192,048 | 3/1993 | Wakeman | 251/129.16 |
| 5,211,341 | 5/1993 | Wieczorek | 251/129.16 X |
| 5,240,227 | 8/1993 | Sich | 251/129.16 |

FOREIGN PATENT DOCUMENTS 8809143 12/1989 Germany .

*Primary Examiner*—Stephen M. Hepperle
*Attorney, Agent, or Firm*—Michael J. Striker

[57] ABSTRACT

An electromagnetically operated proportional valve, in particular a pressure regulating valve for automatic transmission of motor vehicles has a magnet housing, a magnet coil and stationary flux guiding elements received in the magnet housing, a magnet armature, a valve member with which the magnet armature cooperates, stationary structural elements forming at least one auxiliary air gap and a working air gap in a magnetic circuit, the valve member cooperating with the stationary structural elements through the at least one auxiliary air gap and the at least one working air gap, at least one of the structural elements cooperating in the working air gap being at least partially provided on at least one surface facing a corresponding another structural element with at least one nonmagnetic coating.

5 Claims, 5 Drawing Sheets

22a
21a
24a
51a
25
12
19a 50b
21b
22b
51b
23b
12b 51c
23c
21c
22c
12c
50c

ELECTROMAGNETICALLY OPERATED PROPORTIONAL VALVE

BACKGROUND OF THE INVENTION

The present invention relates to an electromagnetically operated proportional valve, in particular a pressure regulating valve for automatic transmission of motor vehicles.

Such proportional valves are known in the art. One of such valves is disclosed for example in the German document DE 88 09 143 U1. The proportional valves of this type have to satisfy in operation the requirements with regard to service life and quality. In particular, a constant valve characteristic line (pressure/exciting current characteristic line or throughflow-exciting current characteristic line) must be guaranteed over a maximum long service life. Such proportional valve however can operate in more or less contaminated pressure medium circulation, and therefore due to leakages from pressure chamber and armature chamber ferromagnetic contaminating particles can accumulate in the armature chamber. In particular, when the armature chamber of the proportional magnet for producing a hydraulic damping is filled with a damping fluid (for example pressure medium), the inflow of the contaminating particles is facilitated. These ferromagnetic contaminating particles are deposited in the armature chamber and accumulated at the locations with greater magnetic field density. The area with the greater magnetic field density is as a rule, the working air gap of the magnetic circuit. Thereby in operation during the service life of the proportional valve a displacement of the valve characteristic line due to the influence of the magnetic resistance in the working air gap occurs. With growing deposits of ferromagnetic particles in the working air gap a bridge formation takes place and can lead to failure of the valve.

SUMMARY OF THE INVENTION

Accordingly, it is an object of the present invention to provide an electromagnetically operated proportional valve, in particular a pressure regulating valve for automatic transmissions of motor vehicles, which avoids the disadvantages of the prior art.

In keeping with these objects and with others which will become apparent hereinafter, one feature of the present invention resides, briefly stated, in an electromagnetically operated proportional valve in which at least one of the structural elements of the magnetic circuit cooperating in the working air gap at at least one surface facing a corresponding outer element is provided at least partially with a non-magnetic abutment.

When the electromagnetically operated proportional valve is designed in accordance with the present invention, the accumulation of ferromagnetic dirt particles in the region of the working air gap is avoided and a bridge formation between both cooperating counter elements of the magnetic circuit and therefore blocking and/or a magnetic short circuiting are substantially more difficult. It is advantageous when the non-magnetic abutment in the region of the working air gap is electrically conductive since in the non-magnetic abutment in the region of the proportional valve eddy currents are produced and their power action counteracts the movements of the magnet armature. Thereby the movement of the magnet armature can be electrically dampened. An electrical damping has a great advantage when compared with the hydraulic or viscose damping since it is substantially less temperature dependent.

In accordance with a further embodiment of the proportional valve, the ferromagnetic abutment is composed of a material whose heat expansion coefficient is greater than the heat expansion coefficients of the structural elements cooperating in the working air gap. Thereby an operational temperature-dependent volume change of the air gap is provided by which the response property of the proportional valve is optimized at different operational temperatures.

It is especially advantageous when the non-magnetic abutment is both electrically conductive and its heat expansion coefficient is greater than those of the cooperating structural elements. In this case the advantages of electrical damping and a temperature-dependent volume change of the working air gap are combined.

The arrangement of the non-magnetic abutment in the working air gap is especially efficient when the working air gap is filled with a damping fluid and in particular the pressure medium. In this case on the one hand the especially high yield of ferromagnetic dirt particles is prevented, and on the other hand due to the non-magnetic abutment a sufficiently high viscose damping in the working air gap is produced since the gap width reduces with constant distances of the magnetically operating structural elements. The reducing pressure medium gap with a substantially constant distance of the magnetically cooperating structural elements (air gap) increases the flow speed of the damping fluid during movement of the magnet armature. Thereby a substantially improved rinsing action in the working air gap is produced and the eventually available ferromagnetic dirt particles are easier rinsed out.

It is further advantageous when both the counter elements of the magnetic circuit cooperating in the working air gap are provided at least partially with a non-magnetic abutment, since then a bridge formation of ferromagnetic dirt particles is reduced even more.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
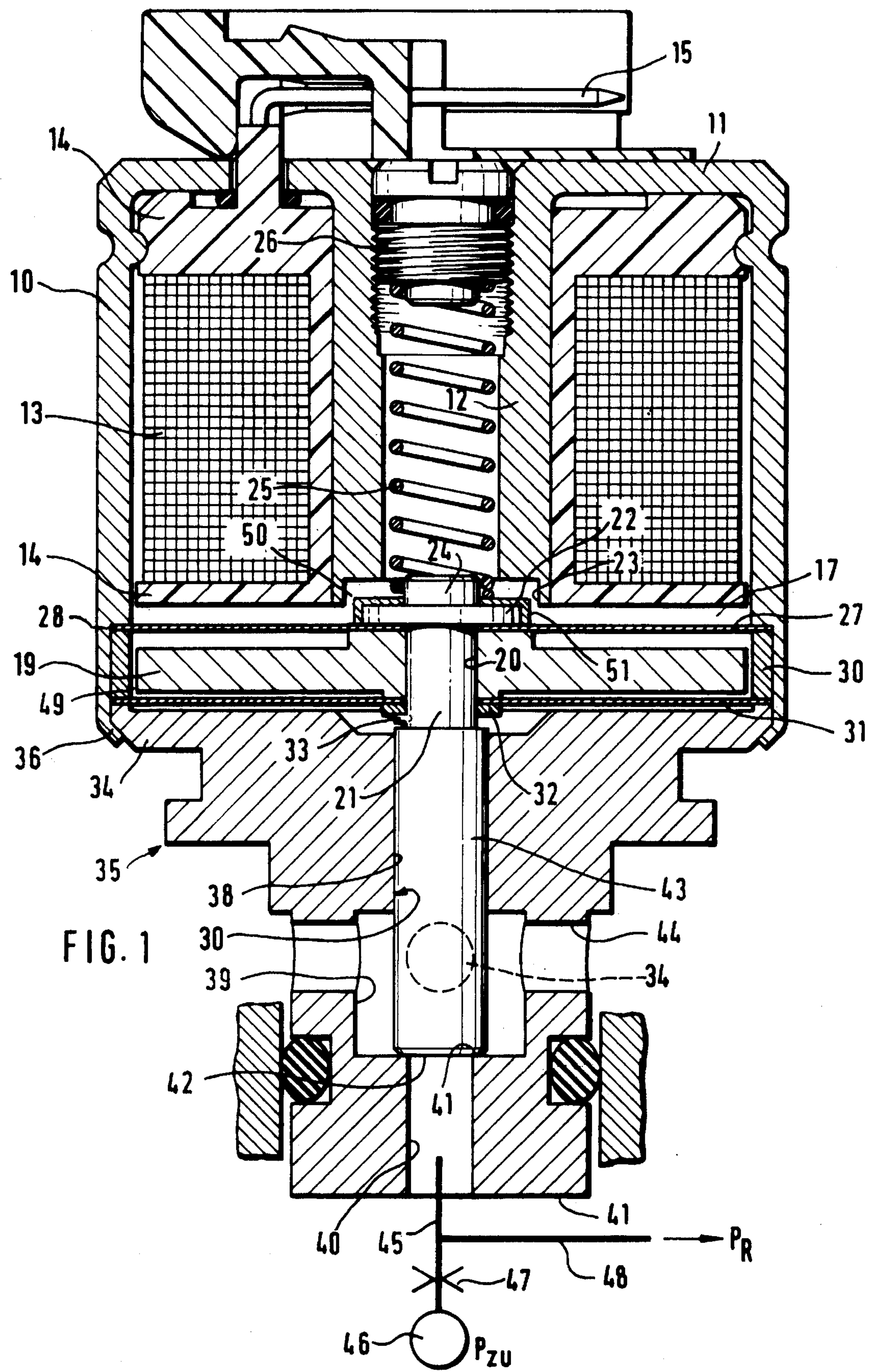
FIG. 1 is a view showing a longitudinal section of a proportional valve with a disc-shaped flat armature in accordance with the present invention.

A proportional valve shown in FIG. 1 is formed as a pressure regulating valve. It has a cup-shaped magnet housing 10 with a bottom 11 and a hollow cylindrical magnet core 12 extends from the bottom into the interior of the magnet housing. A magnet coil 13 together with a coil holder 14 are inserted into the ring space between the magnet core 12 and the magnet housing 10. The electrical connections of the magnet coil 13 extend outwardly through the bottom 11.

A flat, disc-shaped magnet armature 19 extends in an armature chamber 17 before a free end side of the magnet coil 13 or the magnet core 12. The magnet armature 19 has a central throughgoing longitudinal opening 20, and a plunger 21 extends through the opening. The plunger at its side facing the magnet core 12 has a cylindrical portion 22 of greater diameter. This portion flatly abuts against the magnet armature 19 and extends to a cylindrical depression 23 of the magnet core 12. A cylindrical projection 24 is connected with the cylinder portion 22 and extends into the interior of the magnet core 12 for guiding a spring 25 arranged in the magnet core 12. The spring 25 abuts with its one end side against the cylinder portion 22 and abuts with its opposite side against an adjusting screw 26 which is screwed in the region of the bottom 11 in the magnet armature 12 and is accessible from outside.

A ring shaped diaphragm spring 27 is clamped between the cylinder portion 22 and the magnet armature 19 with its inner periphery. Its outer periphery abuts against a step 28 formed in the magnet housing 10. The diaphragm spring 27 is pressed by a flux guiding ring 30 against the step 28. The flux guiding ring 30 surrounds the magnet armature 19 with a radial distance relative to it. At its end side which is opposite to the first diaphragm spring 27, a second ring-disc-shaped diaphragm spring 23 abuts with its outer periphery. Its inner periphery surrounds the plunger 21 and abuts against the magnet armature 19. The second diaphragm spring 31 is pressed by a safety ring 32 against the magnet armature 19. The safety ring 32 is secured by wedging 33 of the plunger against an axial displacement. The flange-like edge 34 of a valve closing element 35 abuts against the outer periphery of the second diaphragm spring 31. By flanging of the free edge 36 of the magnet housing 10 around the flange-like edge 34 of the valve closing element 35, the valve closing element 35, the both diaphragm springs 37 and 31 and the flux guiding ring 30 are fixed in the magnet housing 10.

The valve closing element 35 has a longitudinal opening 38 extending from the armature chamber 17 and opening into a cylinder chamber 39 of a greater diameter. A second longitudinal opening 40 of a greater diameter which is coaxial to the first longitudinal opening 38 extends from the cylinder chamber 39. It passes through the valve closing element 35 to its free end side 41.

The transition between the second longitudinal opening 40 and the cylinder chamber 39 is formed as a flat valve seat 41 so that the flat end side 42 of a cylindrical valve member 43 abuts against the valve seat 41. The valve member 43 is guided in longitudinal opening 38 of the greater diameter and abuts against the plunger 21 with its end side facing away from the valve seat 41. A transverse opening 44 extending through the valve closing element 35 opens into the cylinder chamber 39 and is connected with a not shown consumer. The second longitudinal opening 40 is connected through a supply 45 with a pressure medium source 46.

The above described proportional valve operates in a known manner in a hydraulic bridge circuit as an electrically adjustable pressure regulating valve in connection with a measuring orifice 47 inserted in the supply 45. The regulated pressure $p_R$ in a branch 48 from the supply 45 behind the measuring orifice 47 corresponds to the equilibrium between the pressure force applied on the valve member 43 by the supply 45 and the force of the spring 25 acting through the plunger 21. When the magnet coil 13 is supplied with current, a magnetic force which is opposite to the pretensioning of the spring 25 is applied to the magnet armature 19 and thereby to the plunger 21. The pressure force required for the power equilibrium is therefore smaller, or in other words a lower system pressure $p_R$ is adjusted. The above described proportional pressure regulating valve has therefore a falling pressure-exciting current characteristic line.

For forming a magnetic circuit, the magnet housing 10, the magnet core 12, the flux guiding ring 30, the magnet armature 19 and the plunger 21 are composed of magnetically conductive materials. The valve closing element 35 and the valve member 43 are non-magnetic. The stationary structural elements of the magnetic circuit cooperating with the magnet coil 13, the magnet housing 10, the magnet core 12 and the flux guiding ring 30 are separated by two air gaps from the movable structural elements in particular the magnet armature 19 and the plunger 21 of the magnetic circuit. The ring space between the outer periphery of the magnet armature 19 and the inner periphery of the flux guiding ring 30 forms a radial auxiliary air gap 49. The distance between the outer periphery of the magnet armature 19 and the inner periphery of the flux guiding ring 30 remains substantially the same during movement of the magnet armature 19. In other words, parts of the magnetic field acting in the auxiliary air gap 49 have no influence on the movement of the magnet armature 19. The working air gap 50 of the magnet circuit increases during the operation of the proportional valve between the cylindrical depression 23 in the magnet core 12 and the cylindrical portion 22 of the plunger 21. The width of the working air gap 50 changes during movement of the magnet armature 19 or the plunger 21. In other words, the distance between the end side of the cylinder portion 22 and the bottom of the depression 23 is changeable.

In operation of the proportional valve the armature chamber 17 and thereby the inner space of the magnet core 12 which is closed at one side by the adjusting screw 26 are filled with pressure medium for damping the magnet armature 19. Therefore the auxiliary air gap 49 and the working air gap 50 of the magnetic circuit are filled with pressure medium. For preventing during the operation of the proportional valve an accumulation of ferromagnetic particles in the working air gap 50, the space with the greater magnetic field density, the cylinder portion 22 is provided with a ferromagnetic coating 51 at its end side facing the magnet core 12 and at its outer periphery. Thereby a separating layer is formed on the cylinder portion 22 which makes difficult deposition of ferromagnetic particles. The coating 51 in the shown embodiment is formed as a deep-drawn cap which surrounds the projection 24 and is fixed by the spring 25 on the cylinder portion 22. The cap can be formed for example of copper or aluminum. In this case the coating 51 is non-magnetic but electrically conductive, so that during operation of the proportional valve eddy currents are induced in the coating 51. Thereby when the magnet core 13 is supplied with current a force counteracting the movement of the magnet armature 19 is produced by the eddy currents. Therefore an additional electrical damping is provided in addition to the hydraulic damping actuated by the pressure medium filling.

Since copper or aluminum as a rule have a greater heat expansion coefficient than the iron elements of the magnetic circuit, the pressure medium which fills the proportional valve or the armature chamber 17 expands the coating 15 stronger than the iron parts during warming. As a result the gap between the plunger 21 and the magnet core 12 acting for hydraulic damping reduces during warming. Therefore, despite reducing viscosity of the dampening pressure medium at increased temperatures a constant or improved damping is provided. To the contrary, the gap between the magnet core 12 and the plunger 21 acting for the damping increases with reducing temperatures, so that despite the increased viscosity of the dampening pressure medium a good response property is possible.

In order to better the advantageous action of the greater heat expansion of the coating 51, it can be made of a synthetic plastic material which is either electrically non-conductive or is made electrically conductive by corresponding admixtures. The coating 51 can be produced in a deep-drawing, turning, flow pressing or other suitable manufacturing processes. In contrast to the above described embodiment, the coating 51 can be glued, soldered or pressed on the cylinder portion 22. It is also possible to form the coating 51 as a layer which is applied by a galvanic or other coating methods.

Figure 2:
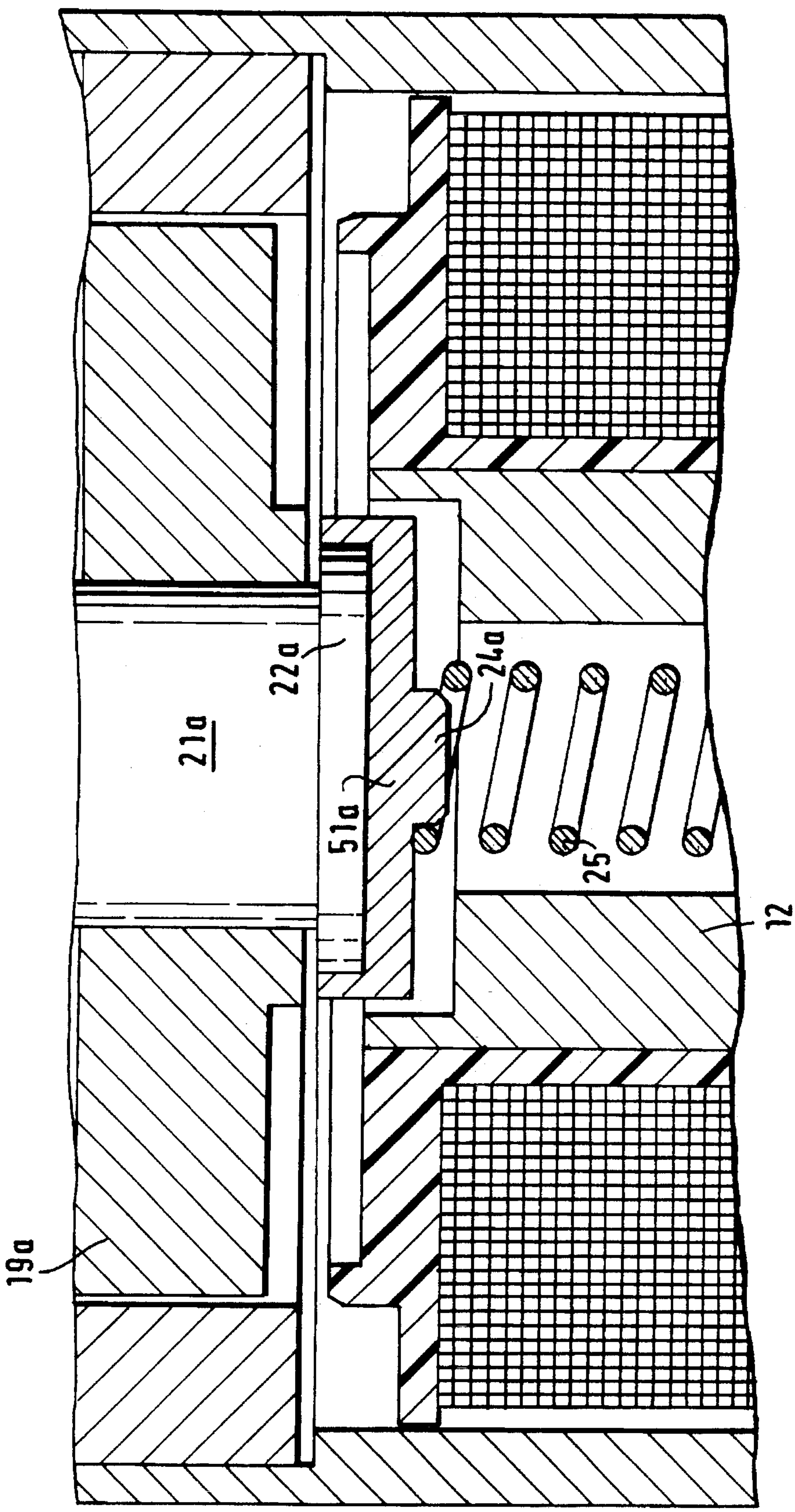
FIGS. 2–4 are views showing partially several modifications of the first embodiment of the present invention of FIG. 1.

FIG. 2 shows another variant of the embodiment, in which the plunger 21*a* is formed without the projection used for guiding the spring 25. Instead the projection 24*a* is formed at the end side of the coating 51*a*, which in contrast to the coating 51 of the embodiment of FIG. 1 has a greater material cross-section. Thereby the formation of dampening eddy currents is improved. With suitable dimensions of the cylinder portion 22*a* or the coating 51*a*, a certain end position damping is provided also for the movement of the magnet armature 19*a*, since volume enclosed in the interior of the magnet core 12 is reduced.

Figure 3:
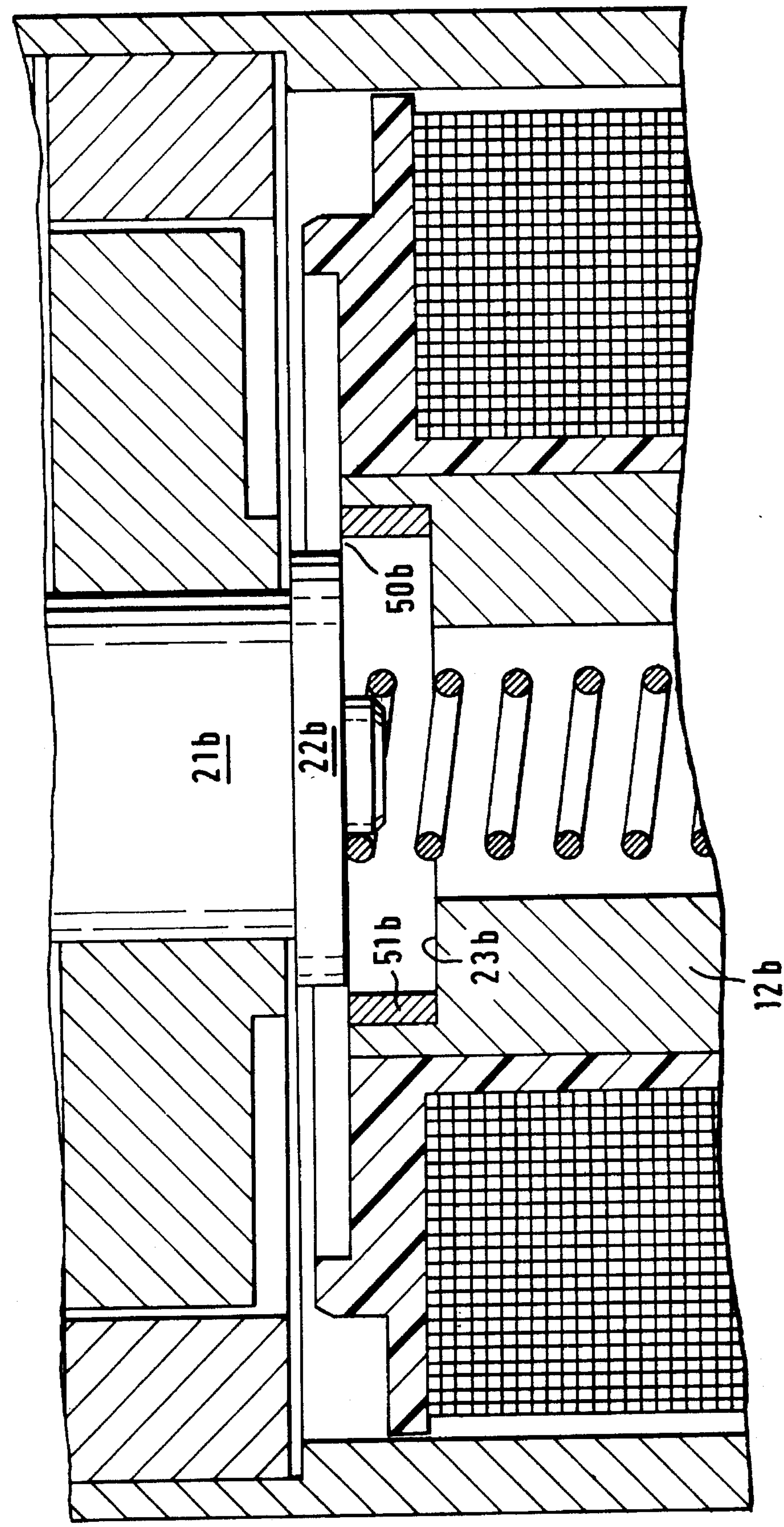
Figure 4:
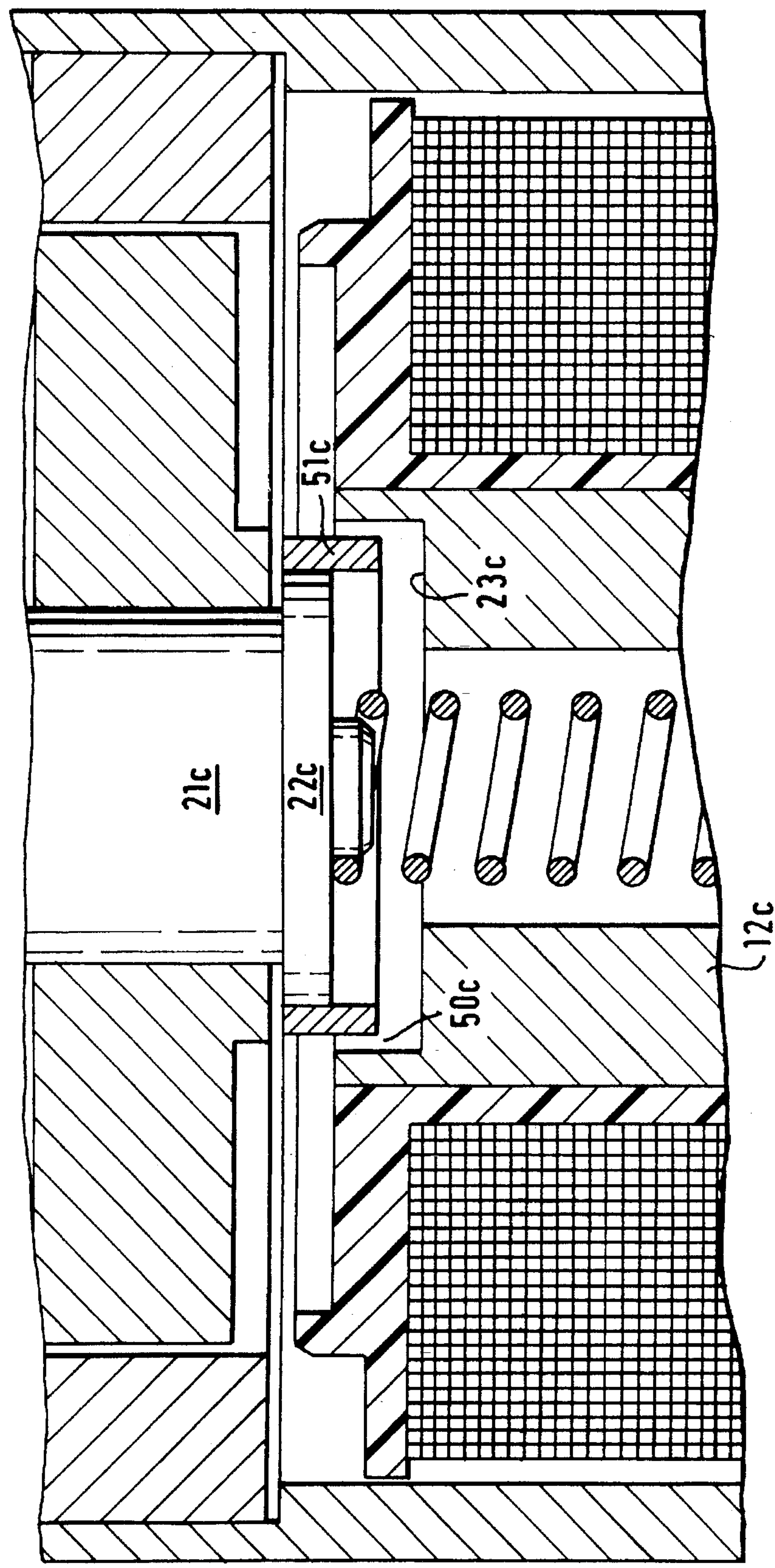

In the variants of the proportional valve shown in FIGS. 3 and 4 the counter elements of the magnetic circuit cooperating in the working air gap 50*b*, 50*c*, in particular the magnetic core 12*b* or 12*c* and the plunger 21*b* or 21*c* as well as the cylinder portion 22*b* or 22*c*, are provided with only a partial coating 51*b* or 51*c*. In the variant shown in FIG. 3 the coating 51*b* is ring-shaped and located on the outer periphery of the cylindrical depression 23*b* of the magnet core 12*b*. In the variant shown in FIG. 4, the coating 51*c* is also ring-shaped and surrounds the cylinder portion 22*c*. The height of the coating 51*c* is greater than the height of the cylinder portion 22*c* or in other words the coating 51*c* extends outwardly beyond the end side of the cylinder portion 22*c* in the depression 23*c* of the magnet core 12*c*.

In all embodiments of the proportional valve, the electrically conductive property of the coating 51 leads to a substantially improved regulating characteristic. In conventional proportional valves of this type the pressure medium filling for hydraulic damping greatly influences the dynamic properties of the valve. Due to the higher temperature dependency of the viscosity of the dampening pressure medium and also manufacturing fluctuations of the gap width, considerable deviations from the predetermined valve characteristic line are possible. Because of the temperature dependency of the viscosity of the dampening pressure medium, there are substantial deviations in permanent vibration properties and reentry vibration properties of the valve. Moreover, due to the manufacturing tolerances, substantial deviations within the valve element row is possible. When in accordance with the present invention and electrical eddy current damping is used alone or in addition to the hydraulic damping, this influence is substantially reduced. First of all, due to the substantially reduced susceptibility to dirtying of the working air gap, the service life of the valve is increased, and on the other hand the characteristic line is maintained better during the service life. In certain situations in the inventive proportional valve additional contamination-reducing features such as the sealing of the armature chamber by sealing diaphragms or mounting of permanent magnets in the pressure medium circuit can be avoided.

Figure 5:
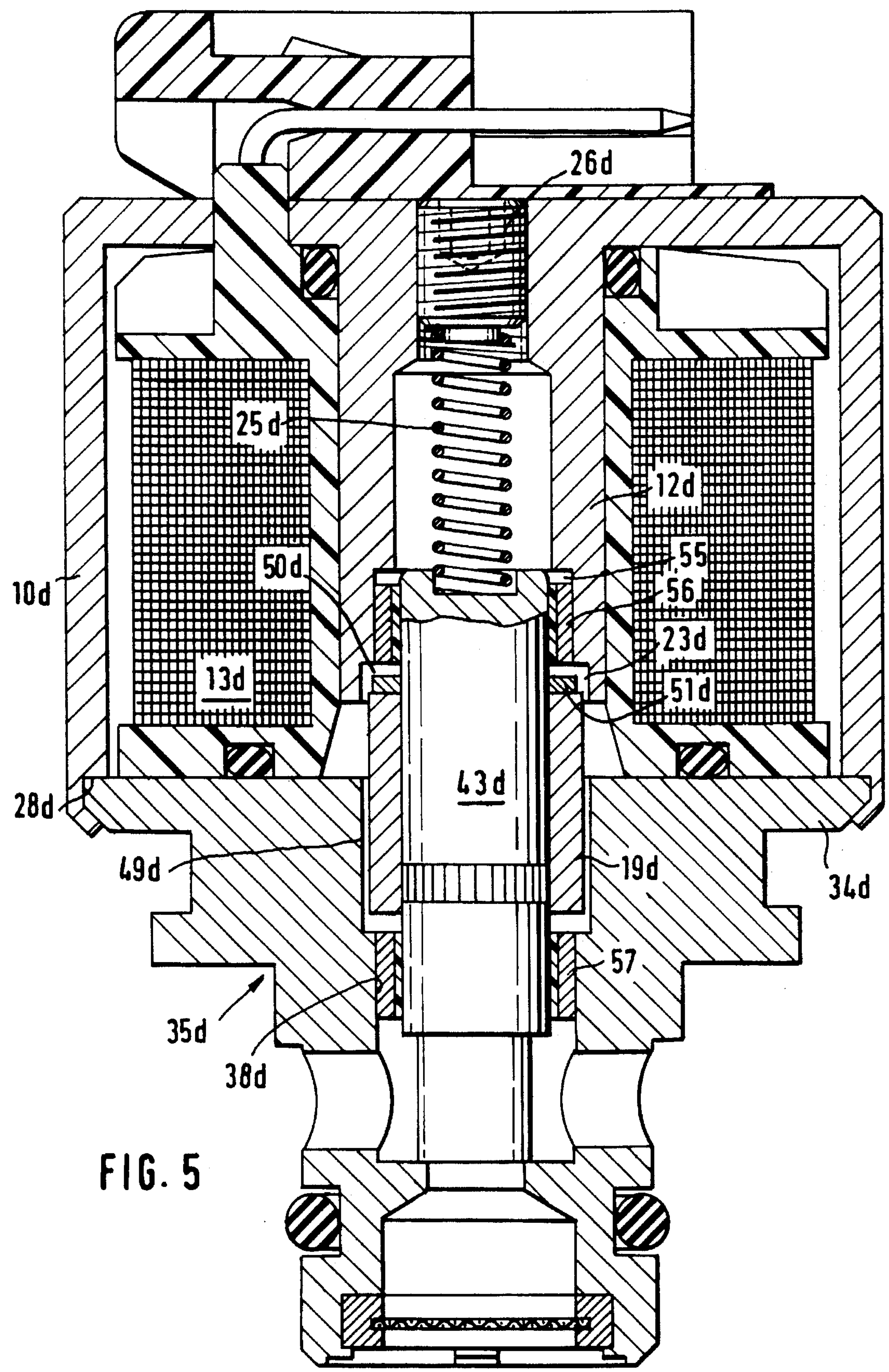
FIG. 5 is a view showing a longitudinal section through a second embodiment of the proportional valve in accordance with the present invention with a slidingly supported cylindrical armature.

In contrast to the above described embodiment of the proportional valve as a diaphragm spring-guided disc armature valve, other structures are possible as well. Another valve embodiment is shown in FIG. 5. In this case the proportional valve is formed with a slidingly supported cylinder armature.

In contrast to the first embodiment, in this proportional valve the flange-like edge 34*d* of the valve closing element 35*d* abuts directly against the step 28*d* of the magnet housing 10*d* or against the free end side of the magnet coil 13*d*. The magnet core 12*d* has a ring groove 55 extending from the cylindrical depression 23*d* and inserted in a sliding bearing 56. A second sliding bearing ring 57 is inserted in the longitudinal opening 38*d* of the valve closing element 35*d*. A cylindrical valve member 43*d* is supported in both sliding bearing rings 56 and 57. A hollow cylindrical magnet armature 19*d* is pressed on the valve member 43*d*. Its both end sides have a small distance to the sliding bearing rings 56 and 57. The spring 25*d* acting on the magnet armature 19*d* or the valve member 43*d* abuts in this embodiment with its end side facing away from the adjusting screw 26*d* against an end side of the valve member 43*d* extending in the magnet core 12*d*.

The magnetic circuit in this proportional valve is formed by the magnet housing 10*d*, the magnet core 12*d*, the magnetically conductive valve closing element 35*d* and the hollow cylindrical magnet armature 19*d* in cooperation with the magnet coil 13*a*. The valve member 43*d* as in the first embodiment is composed of a non-magnetic material. The auxiliary air gap 49*d* of this embodiment is formed in a ring space between the magnet armature 19*d* and the opening portion of the longitudinal opening 38*d* of the valve closing element 35*d* which guides the magnet armature. The working air gap 50*d* is formed between the cylindrical depression 23*d* and the adjoining end side of the adjoining outer periphery of the magnet armature 19*d*.

The non-magnetic coating 51*d* in this embodiment is formed as a ring which surrounds the valve member 43*d* and abuts against the end side of the magnet armature 19*d* which faces the magnet core 12*d*.

It will be understood that each of the elements described above, or two or more together, may also find a useful application in other types of constructions differing from the types described above.

While the invention has been illustrated and described as embodied in an electromagnetically operated proportional valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electromagnetically operated proportional valve formed as a pressure regulating valve for automatic transmission of motor vehicles, comprising a magnet housing having an axis; a magnet coil and stationary flux guiding elements received in said magnet housing, said magnet coil having two end surfaces axially spaced from one another; a magnet armature; a valve member with which said magnet armature cooperates; stationary structural elements forming at least one auxiliary air gap and a working air gap in a magnetic circuit, said valve member cooperating with said stationary structural elements through said at least one auxiliary air gap and said at least one working air gap, all said structural elements cooperating in said working gap being at least partially provided with at least one non-magnetic coating formed as an electrically conductive coating so that at least one surface of one of said structural elements facing a corresponding another structural element is provided with said coating, said working air gap being located in an inner space of said magnet coil axially between said end surfaces of said magnet coil.

2. An electromagnetically operated proportional valve as defined in claim 1, wherein said nonmagnetic coating has a heat expansion coefficient which is greater than the heat expansion coefficients of said structural elements cooperating in said working air gap.

3. An electromagnetically operated proportional valve as defined in claim 1, wherein said working air gap is filled with a damping fluid.

4. An electromagnetically operated proportional valve as defined in claim 1, wherein said damping fluid is a pressure medium.

5. An electromagnetically operated proportional valve as defined in claim 1, wherein said working air gap is arranged radially inwardly of said magnet coil.

* * * * *